July 1, 1952  D. K. BUSICK  2,601,966

FLUID FLOW CONTROL

Filed Sept. 23, 1947

INVENTOR.
DON K. BUSICK
BY
Warren H. F. Schmueding
ATTORNEY

Patented July 1, 1952

2,601,966

UNITED STATES PATENT OFFICE 2,601,966

FLUID FLOW CONTROL

Don K. Busick, Columbus, Ohio

Application September 23, 1947, Serial No. 775,590

5 Claims. (Cl. 251—52)

This invention relates to valves for controlling a flow of fluids, and more particularly to a valve adapted to mix and control the discharge of a plurality of fluids.

One of the objects of this invention is to provide a flow control valve which is adapted to mix fluids in predetermined proportions, which controls the discharge of the mixed fluids to produce a predetermined and selected volume and pressure, and which operates to produce the same conditions of fluid discharge each time the valve is operated to the same position.

Another object of the invention is to provide a valve which with a single, easily and manually operated control mixes fluids received from a plurality of sources and discharges the mixed fluids from a discharge point, which also provides a volumetric and pressure control for the mixed fluids, and which facilitates the repeated operation of the valve to a known position to obtain a predetermined flow condition of mixed fluids.

An additional object is to provide a mixing valve of the character described, controlled with a single operating means, capable of mixing two fluids proportionally and to a predetermined degree of fineness with respect to the proportioning, and which also controls the volume of discharge of the mixed fluids to a predetermined degree without affecting the proportioning of the mixed fluids.

It is also an object to provide a flow control and mixing valve of the character described having a single operating control constructed for use in connection with hot and cold water outlets, the valve operating to deliver either hot or cold water separately and according to the volume or pressure desired, and also operating to mix the hot and cold water in any proportion desired and under the latter condition also dispensing the mixed fluids in the volume required from the minimum to maximum flow without changing the degree of proportioning previously selected.

A further object resides in the provision of a valve of the character described which is ruggedly constructed, and which utilizes relatively few controlling parts operating with the contacting surfaces thereof maintained in substantially flat and horizontal planes whereby wear and pitting of such surfaces and resulting leakage is reduced to a minimum.

Further objects and advantages of the present invention will be apparent from the following description, reference being had to the accompanying drawings wherein preferred form of embodiment of the invention is clearly shown.

Figure 1:
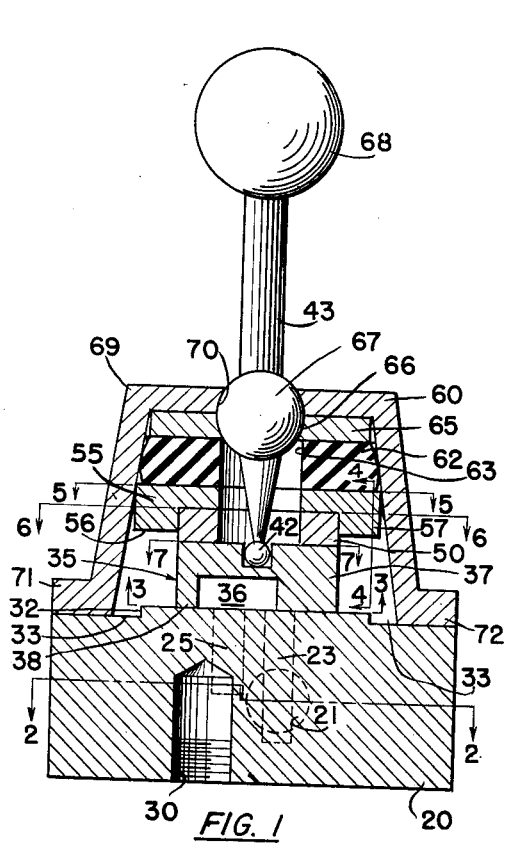
Fig. 1 is a vertical sectional view of a flow control and mixing valve constructed in accordance with the present invention.

Referring further to the drawings, in Fig. 1 the base or lower body member 20 of the valve housing is shown as a substantially rectangular block. However, it will be readily apparent that the shape of this body member may assume other suitable forms such as, for example, circular or rectangular if preferred.

Figure 2:
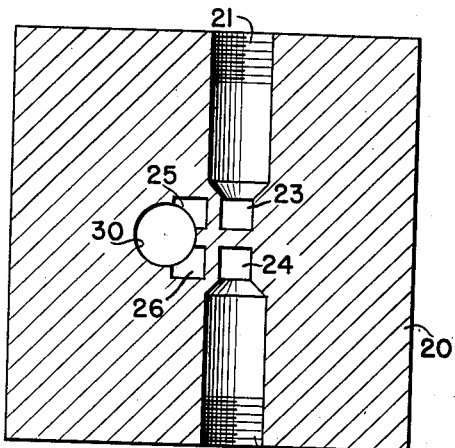
Fig. 2 is a horizontal sectional view taken substantially on the line 2—2 of Fig. 1.

Passages 21 and 22, Fig. 2, having their outer ends threaded are formed within the central part of the body member 20 to provide inlets adapted to be placed in communication through threaded connections (not shown) with different fluid inlet sources. Such sources may be, for example, the hot and cold water supply pipes of a domestic plumbing system. At their inner ends these passages in turn communicate with the vertical passages or ports 23 and 24 extending upward at right angles thereto to the upper surface of body member 20. These latter passages 23 and 24 are formed with substantially square cross sections as seen in Figs. 1 and 2, while those of passages 21 and 22 may be otherwise, being shown as circular.

Also formed in the body member 20 and adjacent to the passages 23 and 24 are a similar pair of parallel passages or ports 25 and 26.

These passages are also of substantially square cross section and extend vertically upwards to the upper surface of body member 20. These passages in turn communicate at their lower end with a single common outlet passage 30 which can be of any preferred form, being shown as circular. Passage 30 is also adapted to be connected at its lower or outer end by means of a threaded connection (not shown) to a fluid outlet such as, for example, a spout outlet in a wash bowl or shower head in a bath tub.

In constructing the vertical passages 23 and 24, it is preferred that the cross sections thereof be approximately ¼ inch square and that the passages be spaced approximately ⅛ inch apart, and in the form shown in Fig. 1 they are about 1 inch in depth. With respect to the outlet passages 25 and 26, it is preferred that they also be substantially ¼ inch square in cross section, spaced about ⅛ inch apart, and extend to a depth of about ⅝ of an inch. Both of these passages then communicate with the single or common outlet passage 30 as previously described. Such construction has been found to provide satisfactory operation under normal domestic hot and cold water supply conditions.

The lower body member 20, which in the preferred form, is about 1¼ inches in height as viewed in Fig. 1, is constructed with a substantially centrally positioned and upwardly projecting shoulder 32 which extends above the body member approximately ⅛ of an inch, but which does not extend to the outer edges thereof. Thus there is formed a recessed area 33 extending entirely around the shoulder 32 which provides a clearance over which the mixer gate 35 extends as it is moved to various operating positions to control the flow of fluids from passages 23 and 24 as more fully explained hereafter. This construction thus prevents the moving mixer gate 35 from forming a rib, because of the sliding contact with the upper surface of shoulder 32 along the outer edge of the shoulder $a$ since the movement of the gate 35 is such as to carry it over and beyond the edge of the shoulder. This shoulder 32 is substantially square in cross section and provides a flat upper surface upon which the mixer gate 35 seats. Also, as previously stated, the upper ends of the passages 23, 24, 25 and 26 all terminate on the upper surface of body member 20, being extended up through the shoulder 32 for this purpose.

The mixer gate 35, comprises in general a substantially square block formed with both top and bottom presenting flat surfaces. The lower surface of this gate seats on the shoulder 32. The mixer gate has a control passage or mixing chamber 36 formed in the underside thereof which serves to connect the inlet and outlet passages in various combinations depending upon the position selected for the gate. As seen most clearly in Figs. 1, 3, 4 and 7, this mixing chamber 36 forms a substantially rectangular shaped opening extending up into the interior of the mixer gate 35 from the underside thereof for a distance of about ¼ inch. This chamber, however, as illustrated extends from approximately the central portion of the mixer gate over toward one edge thereof so as to provide a pad portion 37 on one side of substantially greater width than the edge portion 38 on the opposite side. The pad 37 thus provides a sealing portion of the mixer gate of sufficient width to cover and close off completely both of the inlet passages 23 and 24 to prevent the fluid from one flowing into the other when the valve is closed and no flow of fluids is desired. This feature is highly desirable particularly where the valve is used in connection with mixing and controlling the flow of hot and cold water for example. Without such an arrangement to prevent leakage, it would thus be possible for cold water in passage 24, for example, to flow in the hot water inlet passage 23 and thereby dilute or so lower the temperature of the hot water as to render the system ineffective. In operation the pad member 37 is moved relative to the inlet passages 23 and 24 over which it is mounted so as to provide for opening and closing these passages with respect to the mixing chamber 36 and the outlet passages 25 and 26. Thus when the mixer gate 35 is properly aligned any desired flow and proportioning of fluids can be obtained. The fluids from passages 23 and 24 are under pressure from the domestic water supply system, for example, and thus flow into chamber 36 and are mixed before flowing out of the discharge passages 25 and 26. The mixer gate 35 is shown in Fig. 1 as being moved back to partially uncover the inlet passage 23 whereby fluid from that passage can enter chamber 36 in such volume and pressure as the degree of opening of passage 23 will permit. Passage 25 is also uncovered so the fluid from chamber 36 would then be discharged into passage 30. Whether fluid from passage 24 would also be admitted to chamber 36 to be mixed and discharged with the fluid from passage 23, in the example just stated, would depend upon the alignment and positioning of the pad 37 with respect to passage 24. It is thus possible to control the flow from either passage 23 or passage 24 separately or together as desired.

In the upper surface of the mixer gate 35 there is also provided a centrally positioned blind hole which is approximately ⅛ of an inch deep with a diameter of about ³⁄₃₂ of an inch. This hole is provided to receive a small ball 42 formed as an integral part of the lower end of the operating handle 43 as illustrated in Fig. 1. In this manner movement is imparted to the mixer gate to control the opening and closing of passages 23 and 24.

Figures 3, 4:
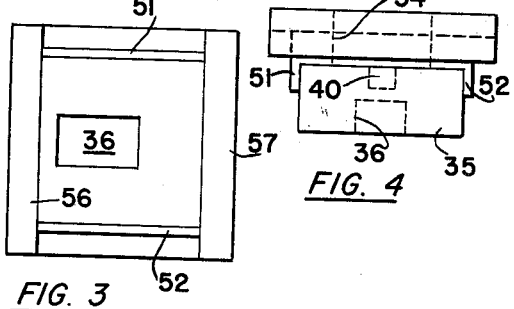
Fig. 3 is a similar sectional view taken substantially on the line 3—3 of Fig. 1 showing the underside of the mixer gate and the guide for the mixer gate key.
Fig. 4 is a side elvation showing the mixer gate, the key for the mixer gate, and the guide for the mixer gate key taken substantially on the line 4—4 of Fig. 1.
Figures 5, 6:
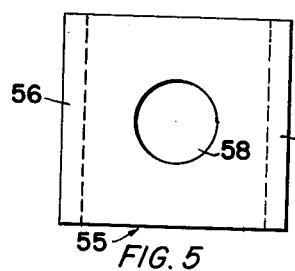
Fig. 5 is a top elevational view of the guide for the mixer gate key taken substantially on the line 5—5 of Fig. 1.
Fig. 6 is a view similar to that of Fig. 5 and illustrating the key for the mixer gate taken substantially on the line 6—6 of Fig. 1.
Figure 7:
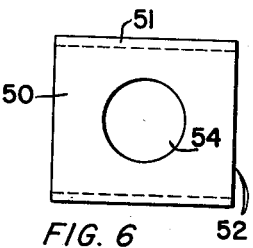
Fig. 7 is also a view similar to Fig. 5 showing the mixer gate and taken substantially on the line 7—7 of Fig. 1.

A channel shaped member or key 50 for moving and controlling the position of the mixer gate 35 is formed with downwardly projecting integral side members 51 and 52 on opposite sides thereof. These side members are so spaced apart that this key is thus adapted to fit down smoothly and closely over the mixer gate as shown in Fig. 4. The mixer gate 35 is thus free to slide between the guide members 51 and 52. A central aperture 54 is formed to extend through the key, and through which the lower end of the operating handle 43 extends. It will thus be apparent that in operation the mixer gate 35 is received within the downwardly extending side members 51 and 52 of the key 50 and thus is free to move with respect to the key in a horizontal plane and in a direction parallel to the side members, but since it is guided between these members it is prevented from moving in a direction at right angles to the channel thus formed.

To provide for moving the key 50 in a horizontal plane and at right angles to the direction of movement of the mixer gate 35, the key is in turn received within a guide member 55. This channel shaped member is formed with integral and downwardly extending side arms 56 and 57 which are spaced apart just sufficiently to engage the key 50 smoothly and closely on two opposite sides thereof. The arms 56 and 57 thus form a channel or guide way in which the key 50 is free to slide. In operation the guide member 55 is so mounted with respect to key 50 that the key is free to move in a horizontal plane, but only in a direction at right angles to the path of movement of the mixer gate 35. A central aperture 58 is also provided through guide member 55 through which the lower end of the operating handle 43 extends. It is to be noted that in construction the guide member 55, which is substantially square in horizontal section is sufficiently wide to extend on all four sides thereof into contact with the inner walls of the cover 60 of the housing. The guide member 55 is thus stationary when mounted and prevented from moving relative to the mixer gate 35 or the key 50 when these members move. There is thus provided means for guiding the movement of the key 50 in one direction and for moving the mixer gate 35 in a direction at right angles only to the direction of movement of the key 50.

To provide for holding the operating members in proper position and alignment with respect to each other, as well as to prevent leakage up through the cover 60 of fluids from passages 23 and 24, a pressure pad 62 is provided. This pad is preferably constructed from compressible material, such as rubber for example, which can be deformed sufficiently under pressure to form a seal against the inner wall surface of cover 60. A central aperture 63 is formed so as to extend through the pad 62 and through which the lower part of operating handle 43 extends.

Mounted within the upper part of cover 60 so as to overlie pad 62 in a contacting position is a substantially square plate 65. This plate is provided with a central opening therein formed to provide a lower seat or socket 66 which received the ball 67 of handle 43 and engages it in an operating relation. Ball 67 is formed as an integral part of the operating handle or lever 43, which is also provided with an upper ball 68 as a convenient hand grip for operating the valve. Plate 65 is retained in position by having its four sides abutting against the interior of housing 60.

Cover 60 as illustrated in Fig. 1 is substantially square in form having upwardly and inwardly tapering side walls on all four sides. However, if preferred this cover can be of any other preferred shape such as circular or otherwise. The central portion of the top member 69 of this cover is provided with an opening formed to serve as an upper seat or socket 70 for the ball 67. Sockets 66 and 70 thus cooperate to form a seat maintaining the ball 67 in proper operating position whereby the mixer gate 35 and key 50 can be moved relative to the guide 55 to control the flow and mixing of fluids within chamber 36. The cover 60 is connected at its lower end to the body member 20 by means of the flanges 71 and 72 extending outwardly therefrom on all four sides, and fastened by bolts or in any other suitable manner as preferred.

In operation, the valve is assembled with the various parts and members positioned as shown in Fig. 1. Movement of the operating handle 43 pivots the ball 67 about in the sockets 66 and 70 whereby the ball 42 causes the mixer gate 35 to be moved in response thereto. The operation of the valve, with respect to controlling the flow or mixing of fluids in any desired proportion, will be more fully understood by reference to Fig. 8 wherein eight out of a plurality of positions of the mixer gate chamber 36 are shown in relation to the inlet passages 23 and 24 and the outlet passages 25 and 26. In position 1 the handle 43 has been moved to a position such that the pad portion 37 of the mixer gate 35 covers completely both of passages 23 and 24. The mixing chamber 36 is therefore out of alignment or register with these passages and no flow takes place from the outlet 30. This is the position of the mixer gate when the valve is in the normally "off" position as when not in use.

Position 2 shows the position of chamber 36 with respect to the inlet and outlet passages when the valve is in the full "open" position for the flow of one fluid only. The full force and volume of the fluid from passage 23 only is directed into the outlet passage 30. If, for example, passage 23 were connected to a source of hot water, the flow from passage 30, which connects directly with passage 25, would be hot water only and in the full volume and pressure available from the source.

In position 3, just the reverse condition from position 2 is obtained. That is, passage 23 is closed by the pad portion 37 and the mixing chamber 36 now forms a connecting passage communicating between only passage 24 and passage 26. Then if passage 24 is connected, for example, with the cold water inlet, the flow from outlet 30 will be a full volume and pressure of cold water only.

The mixer valve 35 has been moved in position 4 so that chamber 36 extends over one half of passage 23 and one half of passage 24. One half of each of the outlet passages 25 and 26 are also in communication therewith. Thus under the conditions previously stated the flow of fluid from passage 30 is a mixture evenly proportioned between hot and cold water. The flow is also full volume and full pressure since the total area of the outlet passages is equal to that of the inlet passages.

In position 5, the operating handle 43 has been moved to a position wherein only one quarter of each of the passages 23 and 24 are in communication with the outlet passages 25 and 26. The outlet flow in this case would also be an evenly proportioned mixture of hot and cold water. However, the volume would be reduced to one half of that obtained in position 4, as well as the pressure since the outlet area is now twice as large as the inlet area.

Position 6 shows the relative arrangement to obtain a partial i. e., one-half normal flow of fluid from only inlet passage 23. Similarly position 7 shows the arrangement necessary to obtain a partial i. e., one-half normal flow from only inlet passage 24. In both of these conditions the area of the respective outlet passages 25 and 26 is greater than the inlet area thus providing for a reduction in pressure corresponding to the reduction in volume obtained.

In position 8 an arrangement is shown whereby a relatively small flow from passage 23 is mixed with a substantially greater flow from passage 24. It will be also apparent that just the reverse condition of mixing and flow can be obtained by simply moving the operating handle 43 until the mixer gate 35 is shifted to the opposite side.

Figure 8:
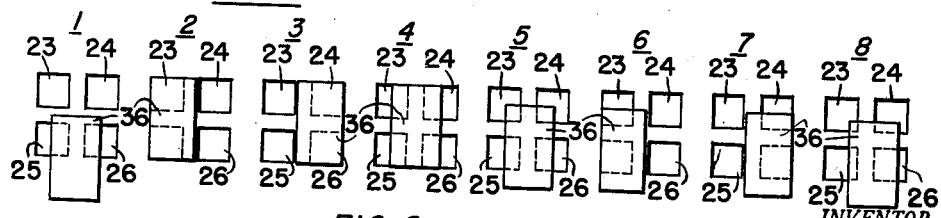
Fig. 8 is a diagrammatic showing of the control passage or mixing chamber in the mixer gate shown in eight different positions with respect to the fluid inlets and outlets to illustrate the operation and degree of control of fluid flow obtained.

From the above explanation, and with reference to Fig. 8, it will be readily apparent that the mixer gate 35 can be shifted at will to obtain any desired condition of flow with respect to either a single fluid or to a mixed combination thereof. Also, that whenever the operating handle 43 is moved again to the same position the mixer gate is always shifted to the same position and the same condition of flow from the outlet is always obtained. This feature is a very desirable one, particularly in installations such as beauty parlors, barber shops, and the like where the operator can with one hand adjust the valve from the closed or "off" position to a predetermined selected position wherein just the proper volume of hot and cold water mixed to obtain a desired temperature is obtained. The adjustment in this case is also quickly and easily made with a single movement of one hand on the operating handle 43, and without requiring the usual regulation of two separate valves, each of which must be adjusted separately as in the presently customary installations.

It will be apparent from the above disclosure that there is provided a fluid flow control valve which is simply and ruggedly constructed with a minimum of parts, and which operates with a single control to efficiently and economically control the flow of one or more fluids separately or mixed together to produce a desired condition with respect to the volume of discharge and proportioning obtained.

While the form of embodiment of the present invention as herein disclosed constitutes a preferred form, it is to be understood that other forms might be adopted, all coming within the scope of the claims which follow:

I claim:

1. A fluid mixing valve comprising a housing including a portion having a smooth valve surface on the interior thereof and having a main outlet passage extending to the exterior of the housing, said portion having a pair of inlet ports, each of which extends separately to the exterior of the housing; and having a pair of outlet ports commonly connected within said portion to the main outlet passage, each of said ports having an end terminating at said surface, said ends of the ports being each substantially square in cross section and spaced from one another and arranged in the general outline of a square; a valve gate having a smooth valve surface complementing and engaging the first mentioned valve surface and having a recess extending from its valve surface forming a chamber adapted to register with said ports, the mouth of said chamber being rectangular in cross section, said mouth having such length as to substantially span two of the parallelly arranged ports simultaneously and having a lesser width of such dimension as to span substantially one-half of two parallelly arranged ports simultaneously; means for moving the valve gate to various registering positions of the chamber mouth and said ends of the parts; and means for confining the movement of the gate to paths of parallel relationship of the side walls of the mouth and ports.

2. A fluid mixing valve comprising a housing including a portion having a smooth valve surface on the interior thereof and having a main outlet passage extending to the exterior of the housing, said portion having a pair of inlet ports, each of which extends separately to the exterior of the housing, and having a pair of outlet ports commonly connected within said portion to the main outlet passage, each of said ports having an end terminating at said surface, said ends of the ports being each substantially square in cross section and spaced from one another and arranged in the general outline of a square; a valve gate having a smooth valve surface complementing and engaging the first mentioned valve surface and having a recess extending from its valve surface forming a chamber adapted to register with said ports, the mouth of said chamber being rectangular in cross section, said mouth having such length as to substantially span two of the parallelly arranged ports simultaneously and having a lesser width of such dimension as to span substantially one-half of two parallelly arranged ports simultaneously; means for resiliently urging the valve surfaces toward one another; means for moving the valve gate to various registering positions of the chamber mouth and said ends of the ports; and means for confining the movement of the gate to paths of parallel relationship of the side walls of the mouth and ports.

3. A fluid mixing valve comprising a housing including a base, said base having a smooth valve surface on the interior thereof, and having a main outlet passage extending to the exterior of the housing, said base having a pair of fluid inlet ports, each of which extends separately to the exterior of the housing, and having a pair of outlet ports, commonly connected within said base to the main outlet passage, each of said ports having an end terminating at said surface, said ends of the ports being each substantially square in cross section and spaced from one another and arranged in the general outline of a square; a valve gate having a smooth valve surface complementing and engaging the base valve surface and having a recess extending from its valve surface forming a chamber adapted to register with said ports, the mouth of said chamber being rectangular in cross section, said mouth having such length as to substantially span two of the parallelly arranged ports simultaneously and having a lesser width of such dimension as to span substantially one-half of two parallelly arranged ports simultaneously; means for moving the valve gate to various registering positions of the chamber mouth and said ends of the ports; and means for confining the movement of the gate to paths of parallel relationship of the side walls of the mouth and ports.

4. A fluid mixing valve comprising a housing including a base, said base having a smooth valve surface on the interior thereof, and having a main outlet passage extending to the exterior of the housing, said base having a pair of fluid inlet ports, each of which extends separately to the exterior of the housing, and having a pair of outlet ports, commonly connected within said base to the main outlet passage, each of said ports having an end terminating at said surface, said ends of the ports being each substantially square in cross section and spaced from one another and arranged in the general outline of a square; a valve gate having a smooth valve surface complementing and engaging the base valve surface and having a recess extending from its valve surface forming a chamber adapted to register with said ports, the mouth of said chamber being rectangular in cross section, said mouth having such length as to substantially span two of the parallelly arranged ports simultaneously and having a lesser width of such dimension as to span substantially one-half of two parallelly arranged ports simultaneously; means for resiliently urging the valve surface of the gate on the valve surface of the base; means for moving the valve gate to various registering positions of the chamber mouth and said ends of the ports; and means for confining the movement of the gate to paths of parallel relationship of the side walls of the mouth and ports.

5. A fluid mixing valve comprising a housing including a portion having a smooth valve surface on the interior thereof, and having a main outlet passage extending to the exterior of the housing, said portion having a pair of inlet ports, each of which extends separately to to the exterior of the housing, and having a pair of outlet ports, commonly connected within said portion to the main outlet passage, each of said ports having an end terminating at said surface, said ends of the ports being each substantially square in cross section and spaced from one another and arranged in the general outline of a square; a valve gate having a smooth valve surface complementing and engaging the first mentioned valve surface and having a recess extending from its valve surface forming a chamber adapted to register with said ports, the mouth of said chamber being rectangular in cross section, said mouth having such length as to substantially span two of the parallelly arranged ports simultaneously and having a lesser width of such dimension as to span substantially one-half of two parallelly arranged ports simultaneously; a key engaging said valve gate to provide for confining the movement of the gate to a straight line path relative to the key; a guide engaging said key to provide for confining the movement of the key to a straight line path relative to the guide and at right angles to the direction in which the gate is free to move relative to the key; and an operating handle for imparting movement to the gate and key.

DON K. BUSICK.

REFERENCES CITED

The following references are of record in the file of this patent:

UNITED STATES PATENTS

| Number | Name | Date |
|---|---|---|
| 979,084 | Mulder | Dec. 20, 1910 |
| 1,169,090 | Lucke | Jan. 18, 1916 |
| 1,790,168 | Paul | Jan. 27, 1931 |
| 1,855,913 | Hueber | Apr. 26, 1932 |
| 1,863,759 | McGraw | June 21, 1932 |
| 2,020,286 | Bittle | Nov. 12, 1935 |